Dec. 19, 1944.   I. KLEIN   2,365,475
DENTAL MOUNTING DEVICE
Filed March 26, 1941   2 Sheets-Sheet 1
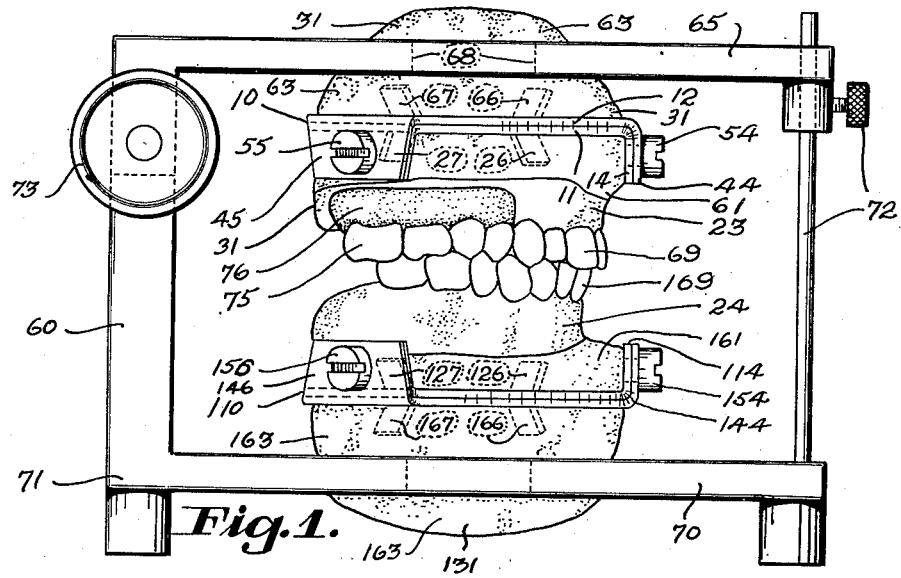
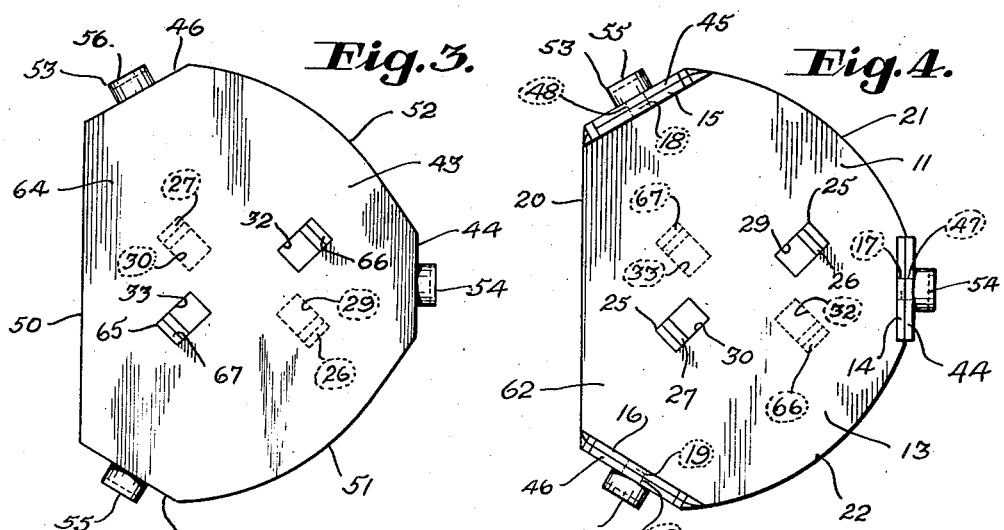
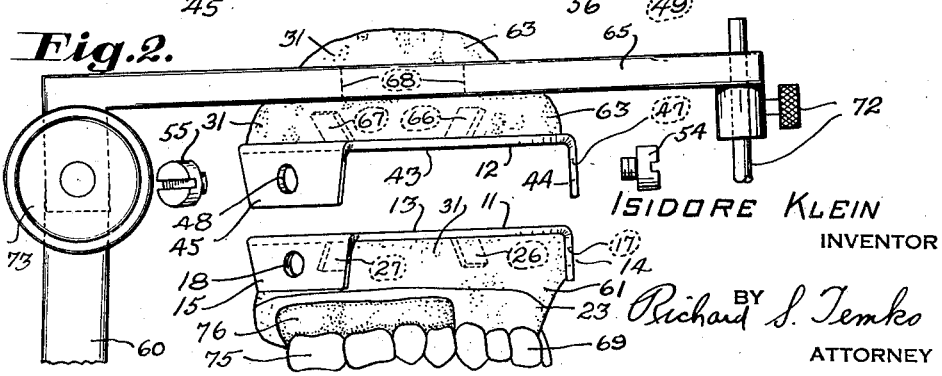
ISIDORE KLEIN
INVENTOR
BY Richard S. Temko
ATTORNEY Dec. 19, 1944.  I. KLEIN  2,365,475
DENTAL MOUNTING DEVICE
Filed March 26, 1941  2 Sheets-Sheet 2
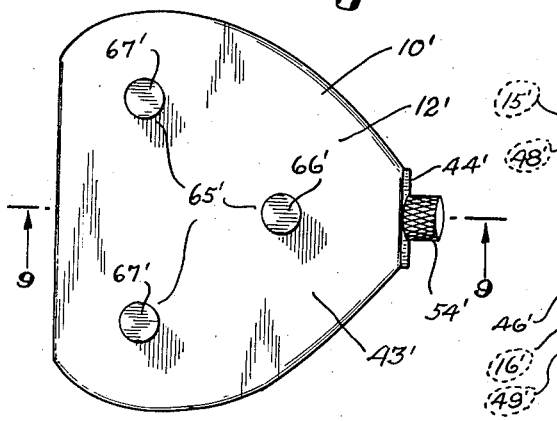
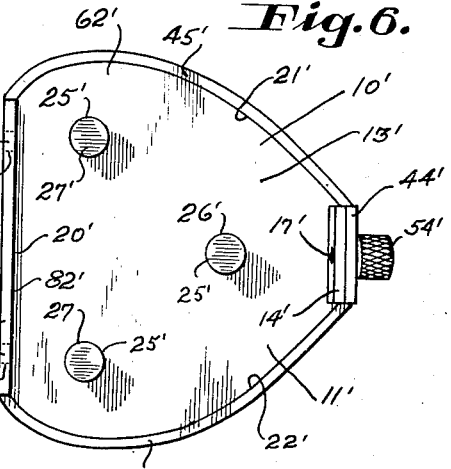
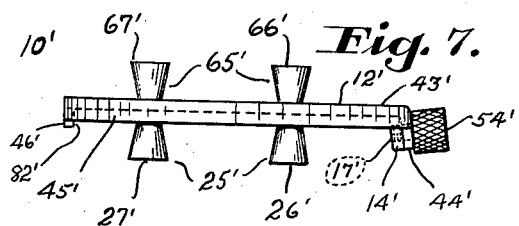
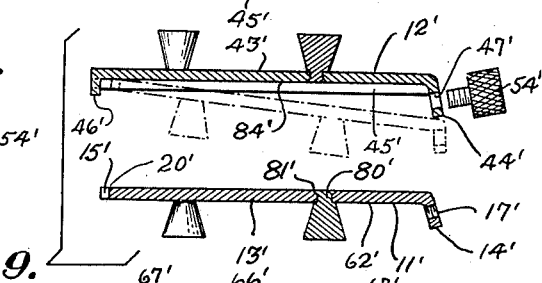
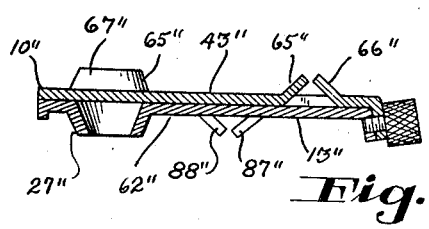
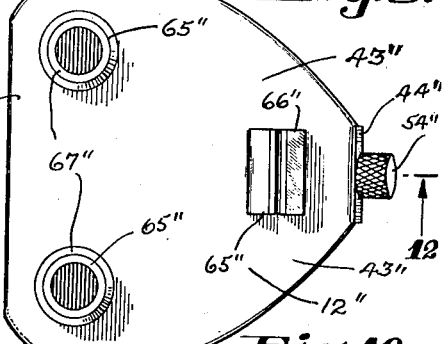
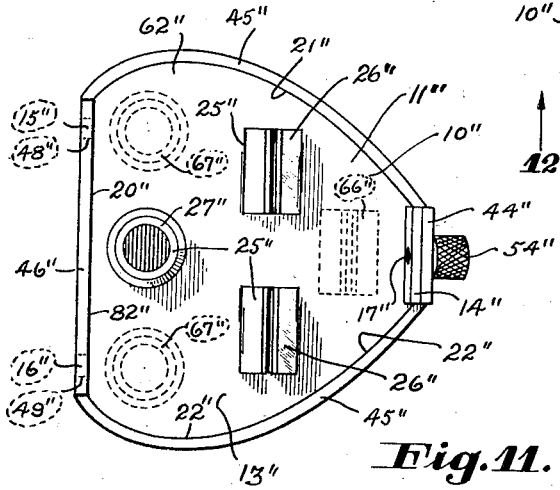
ISIDORE KLEIN
INVENTOR
BY Richard S. Temko
ATTORNEY Patented Dec. 19, 1944

2,365,475

UNITED STATES PATENT OFFICE 2,365,475

DENTAL MOUNTING DEVICE

Isidore Klein, New York, N. Y.

Application March 26, 1941, Serial No. 385,320

3 Claims. (Cl. 32—32)

This invention relates generally to the field of dentistry and more particularly, to dental mounting devices for detachably engaging dental models to the jaws of dental articulators.

Among the principal objects of the present invention, lies the provision of a dental mounting device for balancing the occlusion due to distortion of dentures during vulcanization thereof.

The various materials used for the formation of the base of the denture, that is to say, the material within which the artificial teeth are set and retained, are usually of a thermoplastic nature. During the manufacture of the denture, the said base material is subjected to heat and pressure, and by reason of unequal shrinkage or expansion, or by reason of internal strain set up during the molding process, the denture after vulcanization fails to properly fit the jaw of the patient and fails to make a proper occlusion in the mouth with relation to the teeth on the opposite jaw. After a great deal of painstaking effort on the part of the practitioner in properly locating the parts, this fine positioning is invariably lost during the processing of the denture. Most frequently, the bite becomes raised and there is no way whereby the practitioner is able to correct it, unless a new bite block is taken in the patient's mouth and the parts reassembled on an articulator. This consumes a great deal of time, which is relatively wasted, and since it involves a makeshift correction, the result is usually not as good as that which might have been obtained if the original positioning of the parts was maintained during the processing of the denture.

I have devised a novel means and method for correcting this condition. The said means comprises a dental mounting device composed of two frame elements adapted to disengageably nest within each other.

It is, therefore, an object of the present invention to provide a dental mounting device having the above described characteristics, which will increase the convenience and speed during the procedure of the making and fitting of a denture to a patient's mouth.

Another object herein lies in the provision of a dental mounting device which permits the model (that is to say, the positive cast of the patient's jaw and teeth) to be removed and replaced upon the dental articulator with absolute accuracy regardless of the number of times that the removal and replacement cycle is made.

Another object herein lies in the provision of a dental mounting device which is capable of use with substantially all of the known articulators, requiring no special attachment or other auxiliary devices for this purpose.

A still further object herein lies in the provision of devices of the class described which are readily made in large scale production at low cost so that the same may have a consequent wide distribution and use.

These objects and other incidental ends and advantages will more fully appear in the progress of this disclosure and be pointed out in the appended claims.

In the drawings, forming a material part hereof, corresponding parts in each of the embodiments in the figures have similar reference characters.

Figure 1 is a side elevational view of two of the devices constituting a first embodiment of the invention, as mounted, in use upon a dental articulator with upper and lower denture jaw casts.

Figure 2 is an enlarged fragmentary elevational view taken generally similarly to Figure 1, but showing only one of the devices with the first and second frame elements in spaced position and with the attaching means displaced.

Figure 3 is a plan view of the upper one of the devices shown in Figure 1.

Figure 4 is a bottom plan view of Figure 3.

Figure 5 is a top plan view of a dental mounting device constituting a second embodiment of the invention, this view being similar to Figure 3.

Figure 6 is a bottom plan view of Figure 5.

Figure 7 is a side elevational view of the second embodiment of the invention, as might be seen from the bottom of Figure 5.

Figure 8 is a rear elevational view of the second embodiment of the invention as might be seen from the left side of Figure 7.

Figure 9 is a central vertical sectional view as seen from the plane 9—9 on Figure 5, the first and second frame elements being separated for purposes of clarity, the attaching means also being displaced.

Figure 10 is a top plan view showing a third embodiment of the invention. This view is similar to Figures 3 and 5.

Figure 11 is a bottom plan view of Figure 10.

Figure 12 is a central vertical sectional view as seen from the plane 12—12 on Figure 10.

Turning now to the first embodiment of the invention illustrated in Figures 1 to 4 inclusive, the dental mounting device is generally indicated by numeral 10. As seen in Figure 1 in which two of the devices are shown, the second device is indicated by numeral 110. Since the device 10 and 110 are identical, a description of one will suffice for both.

The dental mounting device 10 comprises a pair of frame elements, a lower or first frame element 11 and an upper or second frame element 12. The lower frame element 11, best seen in Figure 4, is composed of any suitable material not deleteriously affected by water or the heats and pressures encountered in the vulcanization of dentures composed of rubber, acrylics or other thermoplastic materials. I have found sheet brass of $\frac{1}{16}$ of an inch thickness to be especially suitable. The body 13 of the frame element 11 is preferably flat and includes a plurality of first guide members 14, 15 and 16. I have found that by the use of three guide members, I get an extremely high degree of accuracy in the operation of the device, as will be more fully set forth below. Each of the guide members 14 to 16 inclusive is preferably a downwardly bent ear as viewed in Figure 1, or upwardly bent as viewed in Figure 4, and each of these ears is provided with a threaded orifice, said threaded orifices being numbered 17 to 19 inclusive. The body 13 preferably has a rectilinear rear edge 20 and curved forward edges 21 and 22. The size of the body 13, that is to say, the distance between the rear edge 20 and the forward edges 21 and 22, is determined by the size of the jaw casts 23 and 24 with which the device 10 is to be used. For use with the usual sizes of human jaw casts, it may be stated here that the Figures 1 to 4 are full size.

The guide members are preferably flat and are so arranged that perpendiculars erected from the inner surfaces thereof are adapted to substantially intersect at the central portion of the body 13. The guide members 14 to 16 inclusive are arranged at right angles to the plane of the body 13.

Extending downwardly from the lower surface of the body 13 are a plurality of plastic mass engaging means, hereinafter referred to as plaster engaging means 25, including the prongs or posts 26 and 27. The posts may be secured to the lower surface of the body 13 in any suitable manner, but are preferably formed by cutting tabs in the body 13 and bending these tabs downwardly, thus leaving the orifices 29 and 30.

The tabs or posts 26 and 27 are preferably not disposed at right angles with relation to the plane of the body 13 so that when the posts 26 and 27 are embedded in the plaster, generally indicated by numeral 31, they cannot be removed without breaking the plaster. The posts 26 and 27 are opposite and diagonally arranged with relation to each other so that the orifices 29 and 30 will not coincide with the orifices 32 and 33.

The upper or second frame element, best seen in Figures 3 and 4, is fabricated in generally the same manner and of the same material as the lower frame element 11. The body 43 of the frame element 12 is preferably flat and includes a plurality of second guide members 44, 45 and 46. The number of guide members corresponds to the number of first guide members, previously described. Each of the guide members 44 to 46 inclusive is preferably a downwardly bent ear as viewed in Figure 1 or upwardly bent as viewed in Figure 4, and each of these ears is provided with an orifice, said orifices being indicated by numerals 47 to 49 inclusive. The body 43 has a rectilinear rear edge 50 and curved forward edges 51 and 52. The size of the body 43, that is to say, the distance between the rear edge 50 and the forward edges 51 and 52 is preferably substantially identical with the distance between the rear edge 20 and the forward edges 21 and 22 of the first frame element. The distance between the inner normally vertical opposed surfaces of the second guide members 44 to 46 inclusive is substantially equal to or slightly greater than the distance between the outer normally vertical surfaces of the first guide members 14 to 16 inclusive. This permits the first and second frame elements 11 and 12 to nest with each other so that when nested, they are in accurate registration with each other, and yet the frame elements may be separated in a ready and simple manner for subsequent re-engagement. The attaching means, generally indicated by numeral 53, comprises a plurality of attaching elements 54, 55 and 56, preferably in the form of screws. The screws 54, 55 and 56 penetrate respectively the orifices 47, 48 and 49, and threadedly engage the threaded orifices 17, 18 and 19. Thus, when the frame elements 11 and 12 are in interengagement, they are securely locked in accurate registration by the tightening up of the screws 54 to 56, and conversely, when it is desired to separate the frame elements 11 and 12, the screws 54 to 56 inclusive are removed.

As best seen in Figure 3, the body 43 is provided with a plurality of plastic mass engaging means 65 including the prongs or posts 66 and 67. The posts 66 and 67 may be secured to the lower surface of the body 43 in any suitable manner but are preferably formed by cutting tabs in the body 43 and bending these tabs upwardly, thus leaving the orifices 32 and 33, previously mentioned.

The tabs or posts 66 and 67 are preferably not disposed at right angles with relation to the plane of the body 43, so that when the posts 66 and 67 are embedded in plaster, they cannot be removed without breaking the plaster. The posts 66 and 67 are oppositely and diagonally arranged with relation to each other so that the orifices 32 and 33 will not coincide with the orifices 29 and 30 when the second and first frame elements are interengaged.

*Operation of the first embodiment*

For the purpose of understanding the operation of the mounting device, the same is shown during one stage in the use thereof in Figures 1 and 2, as associated with a dental articulator, generally indicated by numeral 60. In Figure 1, two of the devices are shown, and for the sake of avoiding needless repitition, the lower of the two devices is indicated by numeral 110, and parts thereof corresponding to the upper mounting device 10 are given corresponding reference characters with the numeral "1" as a prefix.

Assuming that it is desired to make a denture for an upper jaw having a few natural teeth, one method of so forming an artificial denture or replacement therefor is herewith given by way of example.

First, an impression of the patient's upper jaw is made in any suitable manner, as for example, by making a negative plaster cast (not shown) of the shape of the upper jaw in the usual C shaped metal casting cup.

Secondly, a positive plaster cast of the upper jaw is made by coating the negative cast with suitable material such as grease or wax, and then filling the negative cast with unset plaster. The device in assembled condition is manually grasped and before the plaster 61, which forms the positive upper jaw cast, has hardened, the posts 26 and 27 are inserted therein so that the upper level of the plaster 61 contacts the lower surface 62 of the body 13.

Third, some soft plaster 63 is placed upon the upper surface 64 of the frame element 12 and by pushing the device upwardly toward the upper arm 65 of the articulator 60 from underneath the same, some of the plaster 63 will be forced upwardly through the keying orifice 68 in said upper arm, the plaster being spread out above the arm. The device 10 is maneuvered until it takes an approximately correct position and the plaster 63 is allowed to set upon the posts 66 and 67.

Fourth, these steps are repeated in connection with the patient's lower jaw and the device 110 in a manner similar to that described in the last three paragraphs, with the exception that before the plaster 163 is allowed to set, the plaster teeth 69 and 169 are positioned with relation to each other by means of a well known wax bite block (not shown) so that the proper occlusion between the teeth occurs. This positioning of the two jaw casts with relation to each other is thus positive and accurate when all of the plaster is hardened, and the distance between the upper arm 65 and the lower arm 70, which is part of the base 71 of the articulator 60, is adjusted by means of the inter-arm distance regulator, generally indicated by numeral 72.

Fifth, while the upper jaw cast 23 is thus connected to the articulator, the same is fitted with the artificial teeth 75 and wax 76, the latter being in the form which the finished denture will take. The artificial teeth 75 are adjusted in position with relation to the plaster teeth 69 and 169 representing the patient's natural teeth while the wax is, of course, shaped to conform to the patient's jaw as represented by the cast 23 thereat. The remaining parts of the jaw cast 23 and the cast of the natural teeth 69 may be treated with a thin coat of grease or wax to facilitate the removal of undesired plaster later on.

Sixth, the upper arm 65 is elevated and maintained in its raised position by an actuation of the clamping hand wheel 73. The screws 54, 55 and 56 are removed; and the first frame element 11, together with the upper jaw cast 23, including the teeth cast 69, the artificial teeth 75 and the wax denture 76, is removed from connection with the second frame element 12.

Seventh, the first frame element with the parts just described attached thereto, is placed in the bottom of a casting flask (not shown) with the teeth directed towards the bottom of the flask. Soft plaster is poured into the bottom of the casting flask until it reaches the necks of the teeth or the gum line. The plaster is allowed to set and the top surface thereof is greased or waxed so as to form a line of subsequent cleavage. At this point, in order to prevent the plaster 61 from entering the threaded orifices 17 to 19 inclusive, these may be filled with soap, wax or grease, or may have a small piece of gummed paper pasted over them by securing the gummed paper to the outer surfaces of the first guide members 14 to 16 inclusive.

Eighth, the top of the casting flask is put into place and plaster is poured to fill the flask.

Ninth, the flask is heated, and the bottom part of the flask with its cast is separated as a unit from the top part of the flask with its cast along the previously described line of cleavage, and the melted wax 76 is poured out. The artificial teeth 75 will then be stuck in the plaster within the bottom part of the flask.

Tenth, the bottom part of the flask is filled with unvulcanized vulcanite or any other unset suitable thermoplastic material around the necks and root portions of the artificial teeth 75, the unvulcanized or unset material being put in place to take the place of the wax 76 previously removed. The two halves of the casting flask are placed together again and subjected to heat and pressure so as to vulcanize or set the material forming the denture base.

Eleventh, after the vulcanization or setting is complete, the top and bottom parts of the flask are separated, the plaster in the bottom part of the flask being broken to permit the removal of the denture which is now upon the jaw cast 23. All other undesired plaster is removed leaving the denture in position upon the upper jaw cast 23 which is still connected to the first frame element 11.

Twelfth, the first frame element is grasped and the paper strips covering the orifices 17 to 19 inclusive are removed, or if wax or soap has been used, this is removed therefrom, and the frame element 11 is nested upwardly within the frame element 12 which is on the articulator 60. The screws 54 to 56 inclusive are replaced and the plate and the frames 11 and 12 are now again in absolute registration occupying the identical position which they previously occupied prior to the vulcanization of the denture.

Thirteenth, the wheel 73 is released and the jaw casts 23 and 24 are brought together with the denture base taking the place of the wax 76 as viewed in Figure 1, the teeth taking substantially the position they had in the step designated "fifth," the regulator 72 providing further means of registration. If there has been any shrinkage, undue expansion or warping of the denture base, the same will be reflected in an incorrect occlusion between the artificial teeth 75 and the cast teeth 169. Should any discrepancy be apparent, it becomes a relatively simple matter to grind away high spots and to make other adjustments so that a perfect fit is obtained.

Fourteenth, the completed denture is removed from the cast 23 and if the jaw casts are not required for further use, they may be removed from the mounting devices 10 and 110 for use of the latter in connection with another patient.

Obviously, any number of different operations may be performed upon the jaw casts of the patient when in the articulator, and the above series of steps is only given by way of example.

Turning now to the second embodiment of the invention illustrated in Figures 5 to 9 inclusive, the dental mounting device is generally indicated by numeral 10' and comprises a pair of frame elements, a lower or first frame element 11' and an upper or second frame element 12'. The frame elements 11' and 12' may be composed of any suitable material as more fully discussed in connection with the description of the first embodiment. The body 13' of the frame element 11' is preferably flat and includes a plurality of first guide members 14', 15' and 16'.

The guide member 14' is a downwardly bent ear, when viewed as in Figure 7, and this ear is provided with a threaded orifice 17'. The guide members 15' and 16' are keys or lugs of generally rectangular configuration and they extend rearwardly from the rear edge 20' in the same plane as the body 13'. The rear edge 20' is preferably rectilinear and the body 13' has curved side and forward edges 21' and 22'. As previously stated, the size of the body 13', that is to say, the distance between the rear edge 20' and the edges 21' and 22', is determined by the size of the jaw casts with which the device 10' is to be used. Figures 5 to 9 are full size. The guide member 14' has a slight forward tilt as best seen in Figures 7 and 9 so that the same forms an obtuse angle with the lower surface 62' of the body 13'.

Extending downwardly from the lower surface 62' of the body 13' are a plurality of plastic mass engaging means, hereinafter referred to as plaster engaging means 25', including the forward post 26' and the rear posts 27'. The said posts may be secured to the surface 62' in any suitable manner, but are preferably riveted by swaging over the shanks 80' thereof, which are seated in flared holes 81'. The posts 26' and 27', below the surface 62', have a frusto-conical shape so that when the posts 26' and 27' are embedded in the plaster, such as that generally indicated by numeral 31, they cannot be removed without breaking the plaster.

As contrasted with the first embodiment, the posts 26' and 27' may be co-axially arranged with relation to the posts 66' and 67', since there are no open orifices through which plastic may pass from the lower surface 62' to the upper surface of the body 13'.

The upper or second frame element 12' is fabricated in generally the same manner and of the same material as the lower frame element 11'. The body 43' of the frame element 12' is preferably flat and includes second guide members 44', 45' and 46'. The guide member 44' is preferably a downwardly bent ear as viewed in Figure 9 and is provided with an orifice 47'. The guide member 44' forms the same angle with relation to the body plate 43' as the guide member 14' does with the body 13'. The guide members 45 are a pair of downwardly bent, oppositely disposed flanges which have the inner surfaces thereof spaced to slidably engage the edges 21' and 22' as best seen in Figure 6. The bottom surfaces of the flanges forming the guide members 45' preferably terminate at a point level with the lower surface 62'. The guide member 46' is preferably a downwardly bent flange as viewed in Figure 9 and preferably extends a short distance below the level of the surface 62'. The inner surface 82' of the guide member 46' is adapted to engage the rear edge 20' of the body 13'. The guide member 46' is provided with a pair of spaced and symmetrically disposed orifices 48' and 49' which are adapted to receive the guide members or lugs 15' and 16'. As shown, the lugs 15' and 16' have a rectangular cross-section and the orifices 48' and 49' have the same cross-section to correspond therewith.

The size of the body 43', that is to say, the distance between the surface 82', the inner surfaces of the guide members 45', and the inner surface of the guide member 44' is preferably substantially identical with the distance between the rear edge 20' and the edges 21' and 22' of the first frame element. This permits the first and second frame elements 11' and 12' to nest with each other so that when nested, they are in accurate registration with each other, and yet the frame elements may be separated in a ready and simple manner for subsequent re-engagement.

The attaching means includes an attaching element 54', preferably in the form of a screw. The screw 54' penetrates the orifice 47' and threadedly engages the threaded orifice 17'. Thus, when the frame elements 11' and 12' are in interengagement, they are securely locked in accurate registration by the tightening of the screw 54', and, conversely, when it is desired to separate the frame elements 11' and 12', the screw 54' is removed.

As best seen in Figures 5, 7, 8 and 9, the body 43' is provided with a plurality of plastic mass engaging means 65', including the posts 66' and 67'. The posts 66' and 67' are attached to the body 43' preferably in a manner similar to that in which the posts 26' and 27' are attached to the body 13'.

As best seen in Figure 9, the engagement of the frame element 11' with the frame element 12' is readily accomplished by placing the lugs 15' and 16' in contact with the lower surface 84' of the body 43'. The frame element 11' will then be in the position indicated by the dot-dash lines in Figure 9. The frame element 11' is then moved rearwardly until the lugs 15' and 16' enter the orifices 48' and 49' respectively. The guide means 14' will then fit rearwardly or inwardly of the guide means 44'. The screw 54' is then inserted and threadedly engages the orifice 17'. A reversal of these operations will result in the separation of the frame elements 11' and 12'.

The operation of the second embodiment is in all general respects similar to that of the first embodiment. The guide means 45' serve not only to assist in the proper positioning of the frame elements 11' and 12' with relation to each other, but also by reason of their apron effect, prevent plaster from getting in between the juxtaposed surfaces of the bodies 13' and 43'.

Turning now to the third embodiment of the invention illustrated in Figures 10, 11 and 12, for the purpose of avoiding needless repetition, parts corresponding to those of the second embodiment are given doubly primed reference characters.

The principal difference between the third embodiment and the second embodiment lies in a change in the form and construction of the plastic mass engaging means, 25'' and 65''. Disposed upon the lower surface 62'' of the body 13'' are the plaster engaging claws 26'' and the plaster engaging hollow cone 27''.

The claws 26'' are symmetrically arranged and spaced from each other and are preferably formed by making an H-shaped incision and forcing down the tabs 87'' and 88''. This form of claw I have found to be particularly effective for obtaining a secure hold on the plaster with which the device is used.

The hollow cone 27'' has a configuration best seen in Figure 12. The converging walls, in converging in a direction away from the body 13'', form frusto-conical keys therewithin, when they are filled with plaster.

The upper surface of the body 43'' is provided with a claw 66'' and hollow cones 67''. The claw 66'' is constructed in the same manner as the claws 26'' previously described; while the hollow cones 67'' are constructed similarly to the hollow cone 27''. As best seen in Figure 11 in which the claw 66'' and the hollow cones 67'' are indicated in dotted lines, the plaster engaging means 65'' are disposed in staggered relation to the plaster engaging means 25''. In this manner, plaster applied upon the lower surface of the body 13'' will not pass through the body 43'' and vice versa. The inner or lower surface of the frame element 12'' acts as a bottom for the openings in the plaster engaging means 25''; while the upper surface of the frame element 11'' acts as a bottom for the opening in the plaster engaging means 65''.

When the frame elements 11" and 12" are separated, and it is desired to remove the plaster affixed to the outer surface of either of said frame elements, it becomes a simple matter to gouge, chip or break out the plaster keys which have formed within the openings of the means 25" or 65".

In all other respects, the third embodiment of the invention, generally indicated by numeral 10", may be used in a manner similar to that described in connection with the first and second embodiments.

It may thus be seen that I have provided a novel dental mounting device which is suitable for all kinds of dental work in which casts of jaws or dentures are used in connection with articulators. Devices constructed in accordance with my invention are simple and foolproof in operation, durable and of low cost. In accordance with the present constructions, dental mounting devices may be made having the above described characteristics and which can be used with all kinds of articulators requiring no special attachments for use therewith.

I wish it to be understood that I do not desire to be limited to the exact details of construction shown and described, for obvious modifications will occur to a person skilled in the art.

I claim:

1. A dental mounting device for use with a dental articulator and a dental model jaw cast, said device comprising a first frame element having a substantially planar first body and a lug extending from one edge thereof, a first bent ear extending from another edge of said first body, a second frame element having a substantially planar second body and a guide member at one edge thereof and projecting above the planar surface of the second body, said guide member being provided with an orifice adapted to receive said lug, a second bent ear extending from one edge of said second body, said first and second frame elements being adapted to be placed in nested relationship by receiving said lug of said first frame element into the orifice of said second frame element and by a combined relative pivotal and sliding movement between said frame elements to cause said first and second bodies to contactively overlie each other in face to face relationship, said first and second ears being so positioned as to be in alignment and to be adjacently disposed in face to face relationship when said frame elements are in nested relationship, said first and second ears being bent at such an angle as to permit the said relative pivotal and slidable movement between the said frame elements, and means to detachably interconnect said ears.

2. A dental mounting device according to claim 1 in which the said means for detachably interconnecting said ears comprises a threaded aperture in the ear of the inner nested frame element and a non-threaded aperture in the ear of the outer nested frame element, said apertures being in alignment, a screw member freely passing through said non-threaded aperture and threadedly received in said threaded aperture.

3. A dental mounting device according to claim 1 in which the outer opposite surfaces of said first and second planar bodies are provided with struck-out portions disposed at angles less than perpendicular to serve as plaster mass holding members to attach a plaster mass to each frame element.

ISIDORE KLEIN.